United States Patent [19]
Wall et al.

[11] 3,723,740
[45] Mar. 27, 1973

[54] DIRECTIONALLY SENSITIVE RADIATION DETECTOR SYSTEM USING IONIZATION CHAMBERS

[75] Inventors: James A. Wall, Pinehurst; Edward A. Burke, Woburn, both of Mass.

[73] Assignee: The United States of America as represented by the Secretary of the Air Force

[22] Filed: Apr. 29, 1971

[21] Appl. No.: 138,427

[52] U.S. Cl. ............. 250/83.6 R, 250/108 R, 313/93
[51] Int. Cl. ............................................... G01t 1/18
[58] Field of Search ......... 250/83.6 R, 83.6 S, 108 R; 313/93

[56] References Cited

UNITED STATES PATENTS

| 2,097,760 | 11/1937 | Failla | 313/93 X |
| 2,562,968 | 8/1951 | Teichmann et al. | 250/83.6 S |
| 2,856,536 | 10/1958 | Cardwell, Jr. et al. | 250/108 R X |
| 2,899,582 | 8/1959 | Hermsen et al. | 250/83.6 R X |
| 2,963,589 | 12/1960 | Neher et al. | 250/83.6 R |
| 3,047,721 | 7/1962 | Folsom et al. | 250/83.6 S X |

Primary Examiner—Archie R. Borchelt
Attorney—Harry A. Herbert, Jr. and Arsen Tashjian

[57] ABSTRACT

An X- and gamma radiation detector having two parallel spaced walls composed of materials of significantly different atomic numbers. Any suitable sensitive medium between the walls may be utilized so as to produce a larger signal when the lower atomic wall faces the source of radiation than when the high atomic number material faces the source.

3 Claims, 2 Drawing Figures

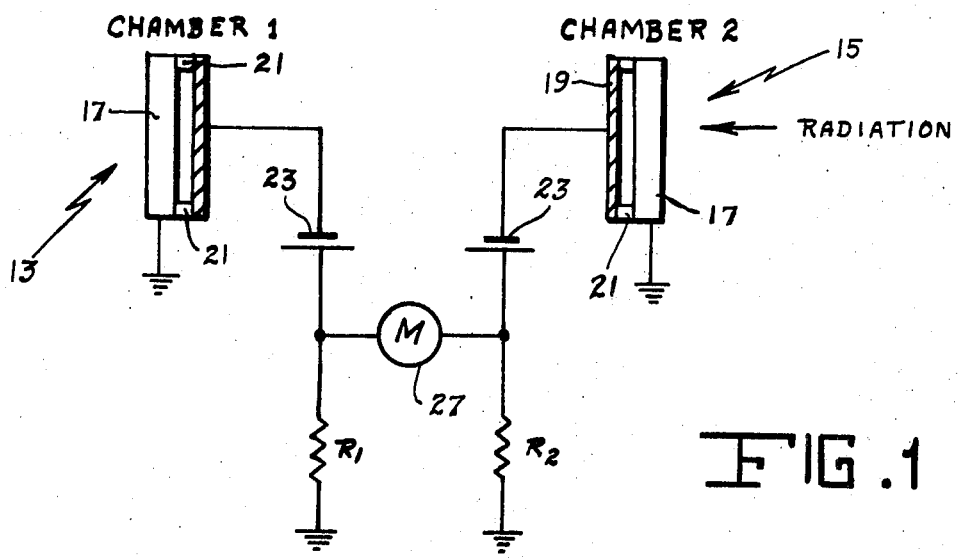
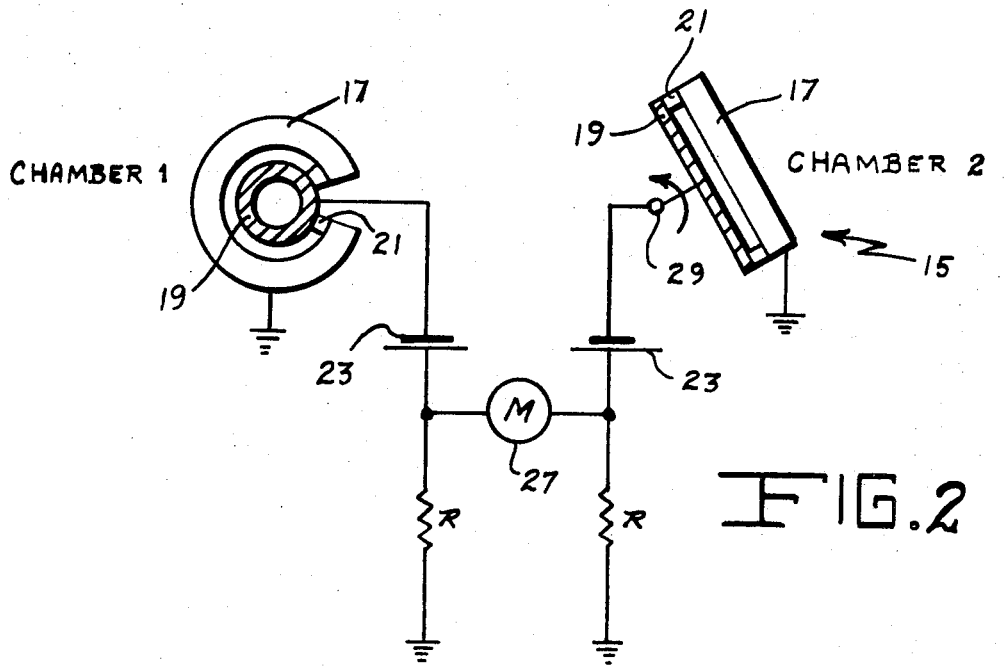

DIRECTIONALLY SENSITIVE RADIATION DETECTOR SYSTEM USING IONIZATION CHAMBERS

BACKGROUND OF THE INVENTION

This invention relates to a directionally sensitive X and gamma radiation detector having two parallel metal plates with an air gap therebetween forming an ionization chamber. One plate is fabricated of high atomic number material while the other is of low atomic number material. An electric potential is applied between the plates and a current proportional to the ionization in the chamber will flow. The amount of current flow will depend on which of the parallel plates is facing the radiation source.

The process by which an electron is removed from an atom, molecule or ion is called ionization and can be accomplished by various means. For example, a free electron may collide with a bound atomic electron and, if sufficient energy can be exchanged, the atomic electron may be liberated and both electrons separated from the residual positive ion. Ionization chambers are used to determine the ionization produced by the fast-moving charged particles. The instruments are especially useful in radiation survey work to indicate the level of intensity of radiation at a point.

When a charged particle moves through a gas, it may pass near enough to an atom in the gas to remove an electron from the atom by the process of electrical attraction or repulsion. Left behind are the negatively charged electron and atom, the latter with a net positive charge. The function of the ionization chamber is to measure the total amount of charge separated in this way by the passage of the charged particle.

Ionization chambers are constructed with two electrodes across which an electrical potential is placed. The negative charge produced in the gas moves toward the positive electrode, and the positively charged ions move toward the negative electrode. The current of moving charges is measured to give the total ionization produced in the gas.

Presently known directionally sensitive radiation detectors which include an ionization chamber require heavy shielding in order to attenuate the radiation in one direction. This produces a detector which is heavy and unwieldy and which is not particularly sensitive to radiation of low energy forms. It would be most desirable tp provide a radiation detector which was directionally sensitive and included an ionization chamber which was not shielded. This would be particularly useful as a portable instrument for the location of X-ray and gamma-ray sources and for the tracking of a vehicle carrying an emitter of X or gamma-radiation.

SUMMARY OF THE INVENTION

The present invention provides a radiation detector which is relatively small and of low total weight and includes ionization chambers having walls of radically different materials. The level of current flow in the chambers is dependent on the radiation that passes which is determined by the particular chamber wall facing the radiation source. Thus, rotating the chamber while measuring the current flow therein, will enable one to locate the direction from which the ionizing radiation is incident on the detector.

Basically, the radiation detector includes two parallel metal plates composed of materials of significantly different atomic numbers. For example, the opposite walls may be aluminum and lead with atomic numbers of 13 and 82, respectively. The walls are separated and supported by an electrically insulating material at their edges. The plates and air gap between them comprise an ionization chamber. When an electric potential is applied between the plates and the chamber is exposed to a source of ionizing radiation, a current will flow between the plates due to ionization of the air between the plates. This current may be measured by conventional means such as a sensitive ammeter placed between the potential source and the chamber. The current flowing between the plates of the chamber will be a maximum when the aluminum (low atomic number) plate faces the source of ionizing radiation and a minimum when the lead (high atomic number) plate faces the source.

Accordingly, it is an object of the invention to provide a small, light-weight radiation detector which is directionally sensitive for use in locating an X-ray or gamma-ray source.

Another object of the invention is to provide a directionally sensitive radiation detector including an ionization chamber having two opposite walls which are composed of materials of significantly different atomic numbers.

Still another object of the invention is to provide an X-ray and gamma-ray detector having rotatable ionization chambers wherein the level of current flowing through the chambers is dependent on which of two significantly different wall materials is facing the source of ionizing radiation.

A further object of the invention is to provide a directionally sensitive radiation detector which includes a pair of ionization chambers, one of which is spherical and fixed and the other of which is plane-parallel and rotatable.

A still further object of the invention is to provide a directionally sensitive X-ray and gamma-ray detector including a pair of plane-parallel ionization chambers each composed of plates of different atomic material separated and supported by an electrically insulating material at their edges. When the chambers are rotated on an axis parallel to the plates, an ammeter placed between the potential source and the chamber will indicate the direction from which the ionization radiation is incident on the detector.

These, and other objects, features and advantages will become more apparent after considering the following description taken in conjunction with the annexed drawing and appended claims.

DESCRIPTION OF THE DRAWINGS

FIG. 1 is a schematic view of a directionally sensitive radiation detector according to the invention showing the rotatable ionization chambers and electrical potential source; and FIG. 2 is another embodiment of the invention which includes a fixed spherical ionization chamber and a rotatable plane-parallel chamber.

DESCRIPTION OF A PREFERRED EMBODIMENT

Referring now to the drawings, there is shown in schematic form two embodiments of a directionally sensitive radiation detector according to the invention. In FIG. 1, the ionization chambers 13 and 15 are of the plane-parallel type having walls that include material of significantly different atomic numbers. In a typical chamber, one wall 17 may be of aluminum having a low atomic number of 13 and the other wall 19 may be of lead having the high atomic number of 82. The aluminum wall 17 may be 0.1 inch thick and the lead wall 19 may be 0.01 inch thick. The walls are separated and supported by an electrically insulating material 21 at their edges.

An electric potential from the sources 23 is applied between the plates 17 and 19 and the chambers 13 and 15 are exposed to a source of ionizing radiation 25 from the direction shown. This causes a current to flow between the plates 17 and 19 due to the ionization of the air therebetween. This current is measured by conventional means such as a sensitive ammeter 27 placed between the potential sources 23 and the chambers 13 and 15. The current flowing between the plates 17 and 19 of the chambers 13 and 15 will be maximum when the aluminum plate 17 faces the source of ionizing radiation 25 and a minimum when the lead plate 19 faces the source 25. Thus, rotating the chambers 13 and 15 on an axis parallel to the plates 17 and 19 and observing the ammeter 27 enables the operator to determine the direction from which the ionizing radiation is incident on the detector.

FIGS. 1 and 2 show simplified schematics of instruments which employ the detector to locate the direction of the source of X-ray or gamma radiation. In FIG. 1, when the radiation is incident as shown, more current will flow through ion chamber 2 and therefore resistor $R_2$ so that the needle on the zero center meter 27 moves toward the source of radiation 25. Rotating the instrument for maximum meter deflection enables determination of the source direction along a line perpendicular to the faces of the chambers 13 and 15.

In FIG. 2, ion chamber 1 is spherical and has the same volume as chamber 2 which has plane-parallel geometry. Chamber 1 is therefore omnidirectional and rotation of chamber 2 around the universal joint 29 will produce a null or minimum on the meter 27 when the low atomic number plate 17 of the chamber 15 faces the radiation source.

Other obvious modifications of the detector and instruments are possible within the scope of the invention. For example, the ionization chamber configuration may be changed to form a Geiger counter or the air gap may be replaced by a silicon wafer containing a p-n junction to form a solid-state detector. The instrument may include several detectors and electronic circuitry to determine which detector produces the largest or smallest signal so that a direction indicator can be activated. In another possible modification of the detector, a servo-mechanism may be employed to automatically rotate the detector and seek a maximum or minimum signal and indicate direction. Also, in the ionization chamber any suitable sensitive medium maybe employed for the detection of the interaction of the radiation with the walls including air for induced ionization, photographic film, or thermoluminescent material. The detector so constructed produces a larger signal in the sensitive medium when the lower atomic number wall material faces the radiation source.

Although the invention has been illustrated in the accompanying drawing in terms of preferred embodiments thereof, the invention is not limited to these embodiments or to the particular configurations mentioned. It will be apparent to those skilled in the art that our directionally sensitive radiation detector could have use in operations where it is necessary to locate the source of X or gamma radiation, such as the location of lost or misplaced radioactive substances and for tracking vehicles which contain an emitter of X or gamma-radiation.

Having thus set forth and disclosed the nature of our invention, what we claim and desire to secure by Letters Patent of the United States is:

1. A directionally sensitive radiation detector for locating and tracking a radiation source comprising, a plurality of unshielded ionization chambers, each of said chambers having a pair of spaced parallel walls, one wall of each of said chambers being composed of a low atomic number material and the opposite wall of a high atomic number material, at least one of said chambers being rotatable on an axis parallel to said walls, electrical potential means for applying a current between the walls of said chambers, and meter means between said potential means and said chambers for indicating the amount of current flowing through said chambers caused by ionization within the chambers produced by the interaction of the radiation source and the chambers, the level of ionizing radiation passing through the walls of said chambers being determined by the atomic number of the material of which the walls are composed and by the angle of incidence of the radiation, thereby indicating maximum and minimum points during rotation of the chambers.

2. The directionally sensitive radiation detector defined in claim 1 wherein the chamber wall of low atomic number material is composed of aluminum and the chamber wall of high atomic number material is composed of lead.

3. The directionally sensitive radiation detector defined in claim 2 wherein the plurality of ionization chambers includes one fixed spherical chamber and one rotatable plane-parallel chamber, the spherical chamber being omnidirectional thereby operating to produce a null on the meter means when the low atomic number wall of the rotatable plane-parallel chamber faces the radiation source.

* * * * *